United States Patent [19]

Caputo et al.

[11] Patent Number: 4,553,414
[45] Date of Patent: Nov. 19, 1985

[54] THEFT PREVENTION DEVICE FOR AUTOMOBILE AUDIO EQUIPMENT

[76] Inventors: Mario A. Caputo, 4905 Avenue "M"; Jeffrey C. Caputo, 4903 Avenue "M", both of Brooklyn, N.Y. 11234

[21] Appl. No.: 617,015

[22] Filed: Jun. 4, 1984

[51] Int. Cl.⁴ .................. B65D 55/14; E05B 73/00
[52] U.S. Cl. .................................... 70/58; 70/167
[58] Field of Search ............ 70/58, 57, 158, 163–173, 70/237, 258; 248/551, 553

[56] References Cited

U.S. PATENT DOCUMENTS

| | | | |
|---|---|---|---|
| 3,699,787 | 10/1972 | Corrado | 70/58 |
| 3,766,759 | 10/1973 | Artner | 70/58 |
| 4,161,869 | 7/1979 | Dixon | 70/166 |
| 4,228,974 | 10/1980 | Yates | 70/167 |
| 4,280,226 | 7/1981 | Jenkins | 70/158 |

Primary Examiner—Robert L. Wolfe
Attorney, Agent, or Firm—Natter & Natter

[57] ABSTRACT

A security cover for automobile in-dash mounted audio equipment provides a protective theft defeating barrier. The cover includes a lock cylinder adapted for removably securing the cover to internal support rods which are pivotally anchored at one end to a portion of the automobile body. The lock cylinder has a shaft which is threadably received in the other end of the support rod. The cylinder can be rotated by a key for urging the cover into engagement with the dashboard and, thus, encasing the audio equipment.

10 Claims, 4 Drawing Figures

THEFT PREVENTION DEVICE FOR AUTOMOBILE AUDIO EQUIPMENT

TECHNICAL FIELD

This invention relates generally to security devices and especially to a protective cover for audio equipment as installed within an automobile dashboard.

In particular, the theft prevention device of this invention concerns the securement of a selectively removable cover plate in an overlapping relationship with respect to the audio equipment.

BACKGROUND ART

There has been a increasing tendency for automobile owners to install expensive stereo sound systems within their automobiles. This has included AM/FM stereo radios, tape players, equalizers and related electronic components for enhanced listening enjoyment. The presence of this equipment within unattended automobiles was susceptible to the unauthorized removal especially since access to the interior of the car was relatively easy. Consequently, security devices have been developed to thwart thieves. Such devices included alarm systems and locking apparatus as typically shown in U.S. Pat. No. 4,211,995. A shortcoming of those devices, however, was that an automobile alarm and/or cable lock could be defeated without great difficulty and thus did not provide an effective deterrent.

Another approach to discourage theft was to conceal the stereo equipment by use of a "false" front which simulated an inexpensive radio such as illustrated in U.S. Pat. No. 4,365,280. The scope of protection provided by that device was limited to the extend that a thief would be deceived.

Additional radio protection devices included a double housing mounted within a dashboard which was designed for slidably holding a stereo radio and/or tape player with plug-socket connection so that the equipment could readily be slipped out by the owner when leaving the car. Such a device is typically sold under the name Bensi Box. A deficiency of this last mentioned device was that it was not convenient to continually insert and remove the radio unit. Furthermore, the effectiveness of this device was dependent in part upon the reliability of the repeated plug and socket interconnections.

Still another concept related to a locking box or cover as shown in U.S. Pat. Nos. 4,248,069, and Pat. No. 3,699,787. The problem with those cover devices was that they did not prevent one from attacking the surrounding dashboard, which are frequently made of friable materials, and thus being able to remove the radio equipment with the cover in place.

The theft prevention device of this invention in contrast, provides an armament for audio equipment which includes a positive securement to a structural portion of the automobile.

DISCLOSURE OF THE INVENTION

The nature of this invention involves a theft prevention device designed to encase the radio equipment within a protective barrier. The barrier is designed for adjustable securement to a mounting assembly and engagement with the dashboard.

In summary, the device of this invention includes a mounting assembly having an anchor bracket attachable to a fire wall behind the dashboard. Support rods are pivotally secured to the anchor bracket at spaced intervals and extend from the anchor bracket to an instrument panel trim plate of the radio equipment. The trim plate is modified by providing auxilliary openings for accessing the ends of the support rods. A recessed cover plate, preferably made of steel and having lock cylinders aligned with the access openings, is adapted for placement over the radio trim plate and surrounding in-dash instrumentation.

The lock cylinders of the cover plate include a locking shaft which is threadably engageable with the end of the support rod. The rotation of the lock cylinder by a mating key provides for adjustable tightening of the cover plate. In addition, the recessed configuration of the cover plate provides clearance for protruding control knobs or other operating buttons and levers extending from the dashboard.

A feature of this invention is that the radio equipment cannot be removed by attacking the surrounding dashboard structure since the radio is mounted to an interior portion of the auto body. In addition, the cover plate provides a formidable barrier for defeating attempts to remove the radio equipment especially from a frontal attack. Another advantage concerns the relative ease of adapting this theft deterrent system to existing radio equipment.

In view of the foregoing, it should be apparent that the present invention overcomes many of the shortcomings and deficiencies of the prior art and provides an improved theft deterrent system for auto radio installations.

Having thus summarized the invention, it will be seen that it is an object thereof to provide a theft prevention device for automobile audio equipment of the general character described herein which is not subject to the aforementioned disadvantages.

Another object of this invention is to provide a theft prevention device including a positive anchoring arrangement.

A further object of this invention is to provide a theft prevention device including a removable cover plate for selectively encasing the radio equipment.

Yet another object of this invention is to provide a theft device wherein the cover plate includes integral locking for adjustably tightening the cover plate to the support mounting.

Still another object of this invention is to provide a theft prevention device which is readily adaptable for use with existing in-dash mounted audio equipment.

Yet another object of this invention is to provide a theft prevention device which is simple in construction, reliable in use, and well adapted for mass production fabrication techniques.

Other objects of this invention in part will be apparent and in part will be pointed out hereinafter.

With these ends in view, the invention finds embodiment in certain combinations of elements and arrangements of parts by which the aforementioned objects and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown an exemplary embodiment of the invention.

BEST MODE FOR CARRYING OUT THE INVENTION

Figure 1:
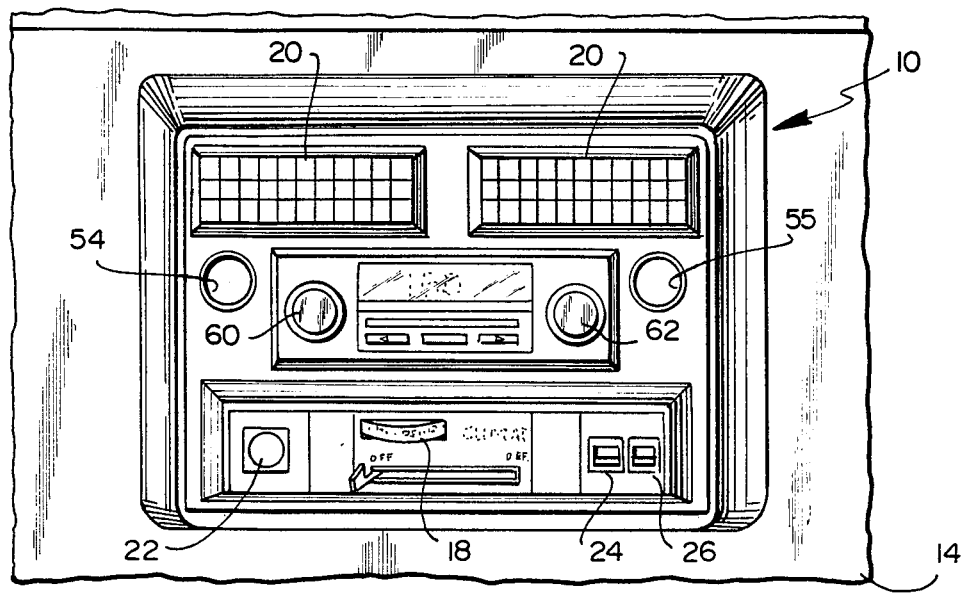
FIG. 1 is an elevational view in perspective showing a typical dashboard mounted stereo radio which has been modified to incorporate the theft prevention device of this invention.

Referring now in detail to the drawings, the reference numeral 10 denotes generally an improved theft prevention device for automobile audio equipment as encompassed by this invention.

The device 10 is intended for use as a modification to existing installations and can also be used as orginal manufacturer equipment. Furthermore, it should be apparent that the theft prevention device 10 can be manufactured in kit form for sale through automobile parts and accessories distrubutors.

With regard to this exemplary embodiment, FIG. 1 shows an AM/FM stereo radio receiver and combination cassette tape player 12 as installed within an automobile dashboard 14. The stereo radio 12 is enclosed behind an instrument panel trim plate 16 which includes access openings for a surrounding instrument cluster including an air conditioning control head 18, air conditioning ducts 20, and outside mirror remote control 22, a window defogging control 24 and an automatic antenna control 26. This arrangmeent is typical of the center instrument panel cluster as found in Cadillac automobiles especially for the model year 1977 through 1983; however, the device 10 of this invention is applicable to other automobile radio installations.

The theft prevention device 10 includes a mounting assembly for supporting a protective barrier in the form of a cover plate 28 preferably made of a durable material capable of withstanding attack by conventional burglar tools. In this preferred embodiment, the cover plate 28 is made of eighteen-gauge steel.

The mounting assembly includes an anchor bracket 30 which is typically bolted in a substantially horizontal orientation to a fire wall 32 which separates the engine compartment from the passenger compartment and is located rearwardly of the dashboard 14. The anchor bracket 30 can be affixed to other suitable structural members of the automobile or its chassis in such manner that securement is independent of the dashboard 14.

Figure 3:
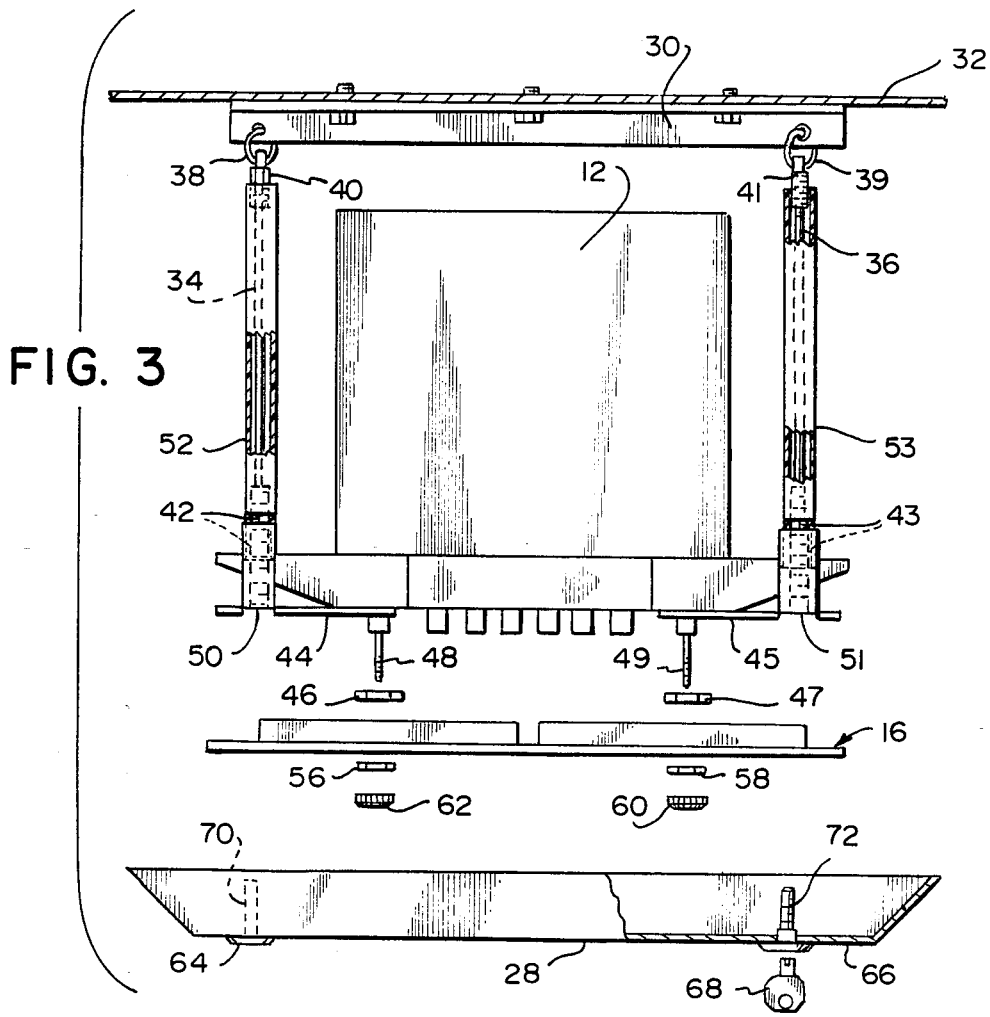
FIG. 3 is a sectional view taken substantially along line 3—3 of FIG. 2 showing, in exploded fashion, the stereo radio and positive anchoring arrangmeent including an anchor bracket and pivotally mounted support rods engageable by a locking shaft extending from the cover plate.
Figure 4:
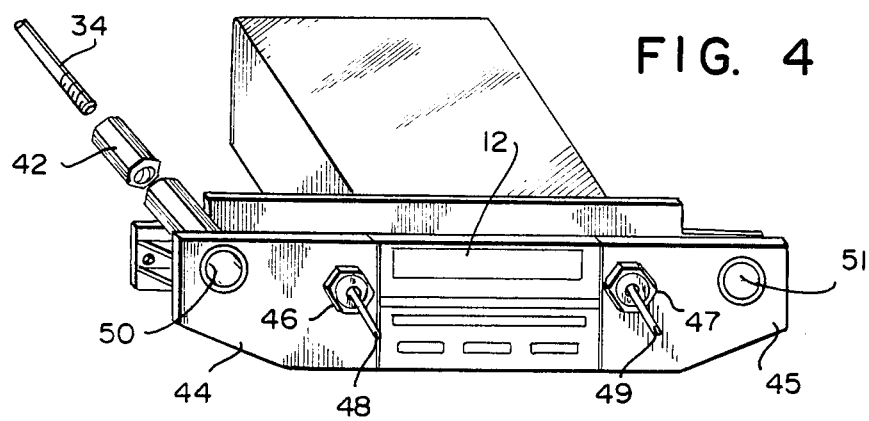
FIG. 4 is an auxilliary isolated view in perspective of a partially disassembled stero radio showing a wing plate affixed to the radio having an access opening for receiving an end of the support rod.

A pair of support rods 34, 36 straddle the stereo radio 12, as best shown in FIG. 3, and extend from the anchor bracket 30 to a forwardly position. In order to facilitate the installation of the mounting assembly, especially when retrofitting the device 10 to existing stereo radios, it has been found that a pivotal connection of the support rods 34, 36 to the anchor bracket 30 expedites assembly within the limited interior area of the dashboard 14. Consequently, an eyebolt 38, 39 connection has been utilized at a distal end of the support rod 34, 36 for attachment to the anchor bracket 30. A collar 40, 41 threadably secures the respective eyebolt 38, 39 to the support rod 34, 36 as best shown in FIG. 3. The forward end of the support rod 34, 36 includes a female coupling member 42, 43 having an internally threaded bore. In order to guide the support rod 34, 36 and position the coupling member 42, 43 a wing guide plate 44, 45 is affixed to the stereo radio 12 by utilizing a hex nut 46, 47 and the radio tuning and volume control shafts 48 and 49 (FIGS. 3 & 4). It should be noted that the hex nut 46, 47 is similar to the nuts utilized for fastening the instrument panel trim plate 16 and thus, the threaded portion of the control shafts 48, 49 does not require any further modification.

The respective wing guide plates 44, 45 also include an open tubular sleeve 50, 51 which is adapted to accommodate the corresponding female couplings 42, 43. In addition, a plastic housing 52, 53 surrounds each of the support rods 34, 36 and the couplings 42, 43 to provide a snug fit within the tubular sleeves 50, 51 so as to eliminate metal-to-metal contact and associated vibratory sounds and interference with radio reception.

Referring once again to the instrument panel trim plate 16, the set of access openings 54, 55 has been provided in registered alignment with the tubular sleeves 50, 51. In addition, the access openings 54, 55 can be provided with a ferrule or short metal sleeve.

After the previously described mounting assembly is in position, the instrument panel trim plate 16 can be repositioned on the dashboard 14 and secured by a set of hex nuts 56, 58 and a station tuning knob 60 and volume control knob 62 reset.

Figure 2:
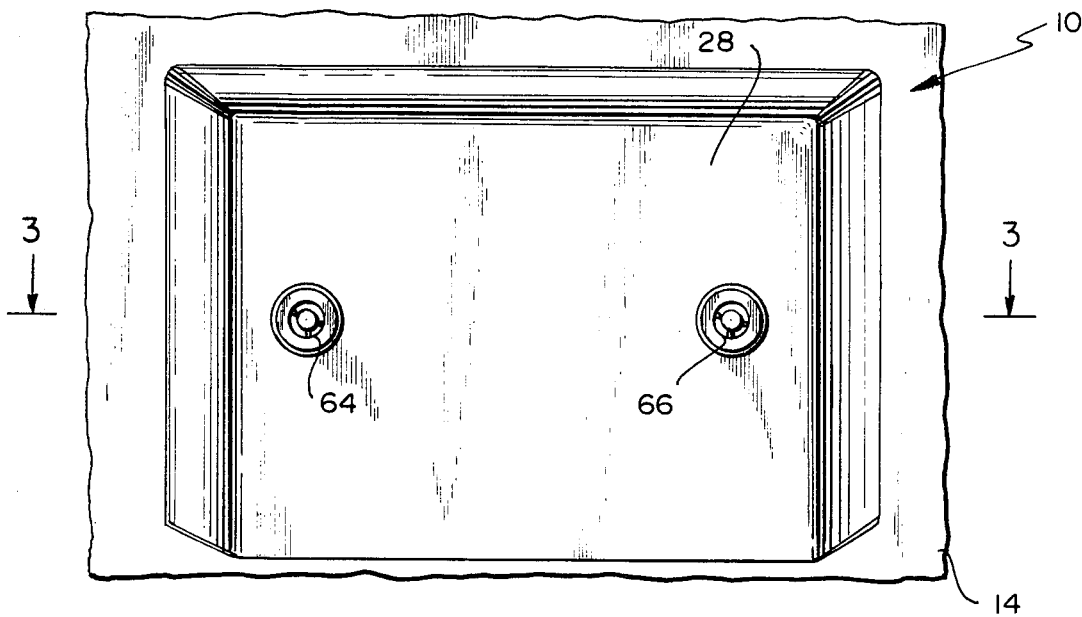
FIG. 2 is an elevational view showing a removable cover plate of this invention as secured over the stereo radio of FIG. 1 and surrounding in-dash instrumentation.

When the automobile is to be left unattended, the cover plate 28 can be readily placed in a protective position, as shown in FIG. 2. For this purpose, the cover plate 28 contains a pair of screw type cylindrical locks 64, 66. These locks 64, 66 can be of the type manufactured and sold under the trademark "Ace" lock. The locks 64, 66 require a companion operating key 68 for activation. Furthermore, the lock cylinder of the present invention has been modified by providing a tightening shaft in the form of a threaded shank 70, 72 adapted for rotation by the key 68. When the cover plate 28 is in position, the tightening shaft 70, 72 is adapted for engagement with the coupling member 42, 43. By turning the key 68, the cover plate 28 will thus be adjustably tightened and urged into engagement with the dashboard 14 in overlying relationship with regard to the stereo radio 12. The recessed contour of the cover plate 28, as shown in FIG. 3, provides clearance for the projecting control knobs 60, 62 extending from the stereo radio 12.

It should thus be seen that there is provided a theft prevention device for automobile audio equipment which achieves the various objects of this invention and which is well adapted to meet conditions of practical use.

Since various possible embodiments might be made of the present invention or modifications might be made to the exemplary embodiments above set forth, it is to be understood that all materials shown and described in the accompanying drawings are to be interpreted as illustrative and not in a limiting sense.

Having thus described the invention, there is claimed as new and desired to be secured by Letters Patent:

1. An improved theft prevention device for an automobile radio receiver as installed within a dashboard and enclosed behind an instrument panel trim plate, said improvement comprising a mounting assembly secured to a portion of the automobile body behind the dashboard, said mounting assembly including an anchor bracket attached to said auto body portion and at least one support rod extending from said anchor bracket forwardly to the dashboard, guide plate means attachable to the radio, said guide plate means being adapted for accommodatingly positioning a forward end of the support rod, said forward end of the support rod further including a coupling member, a cover plate having integral fastening means, said fastening means being adapted for engaging the coupling member for adjustable tightening of the cover plate to urge the cover plate into abutting contact with the dashboard in overlaying relationship with respect to the radio receiver.

2. A theft prevention device as claimed in claim 1 wherein the fastening means includes a cylindrical lock cylinder, said lock cylinder being adapted for rotating an externally threaded tightening shaft, said tightening shaft being compatible for threadable engagement with the coupling member.

3. A theft prevention device as claimed in claim 2 wherein the cylindrical lock cylinder is operative by a key member.

4. A theft prevention device as claimed in claim 3 further including two support rods, said support rods being pivotally secured to the anchor bracket at a distal end thereof.

5. A theft prevention device as claimed in claim 4 wherein the anchor bracket is secured to a fire wall portion of the automobile.

6. A theft prevention device as claimed in claim 5 wherein the instrument panel trim plate is provided with auxilliary openings in registration with the coupling member for accessing the tightening shaft.

7. A theft prevention device as claimed in claim 6 wherein the cover plate is recessed for accommodating projection portions of the radio receiver.

8. A theft prevention device as claimed in claim 7 wherein the cover plate is made of eighteen gauge steel.

9. A theft prevention device as claimed in claim 4 further including a tubular housing providing a protective covering for the support rods.

10. A theft prevention device as claimed in claim 9 wherein the distal end of the support rod includes an eye-bolt pivotal connection to the anchor member.

* * * * *